US006891561B1

(12) United States Patent
Achituv et al.

(10) Patent No.: US 6,891,561 B1
(45) Date of Patent: May 10, 2005

(54) PROVIDING VISUAL CONTEXT FOR A MOBILE ACTIVE VISUAL DISPLAY OF A PANORAMIC REGION

(75) Inventors: Romy A. Achituv, New York, NY (US); Daniel H. Rozin, New York, NY (US)

(73) Assignee: Vulcan Patents LLC, Palo Alto, CA (US)

( * ) Notice: Subject to any disclaimer, the term of this patent is extended or adjusted under 35 U.S.C. 154(b) by 0 days.

(21) Appl. No.: 09/283,770

(22) Filed: Mar. 31, 1999

(51) Int. Cl.$^7$ .............................................. H04N 7/00
(52) U.S. Cl. ........................... 348/36; 348/42; 348/50; 382/284
(58) Field of Search ............................ 348/36, 39, 42, 348/50, 584; 382/154, 284

(56) References Cited

U.S. PATENT DOCUMENTS

| | | | | |
|---|---|---|---|---|
| 5,850,352 A | * | 12/1998 | Moezzi et al. | 364/514 |
| 5,963,664 A | * | 10/1999 | Kuamr et al. | 382/154 |
| 6,075,905 A | * | 6/2000 | Herman et al. | 382/284 |
| 6,078,701 A | * | 6/2000 | Hsu et al. | 382/294 |

OTHER PUBLICATIONS

"Spatial Correspondence in Motion Picture Display," by Michael Naimark, SPIE vol. 462 Optics in Entertainment II, pp. 78–81, 1984.

* cited by examiner

*Primary Examiner*—Chris Kelley
*Assistant Examiner*—George Bugg
(74) *Attorney, Agent, or Firm*—Van Pelt, Yi & James LLP

(57) ABSTRACT

A visual display of a panoramic region is provided in which a static context display is provided for an active display displayed in a mobile display window. Active images are sequentially generated and displayed from temporally sequential frames of visual data that each represent an image defining a region within a larger panoramic region such that at least two of the images define regions that do not coincide. Each displayed image is positioned on a display screen with respect to the position of other displayed images on the display screen in accordance with the spatial relationship in the panoramic region of the content of the displayed image to the content of the other displayed images. At some time during the visual display, one or more context images (a context display) is displayed while an active image is displayed. Each context image is at least part of an image represented by a frame of the set of temporally sequential frames of visual data. Context images can be automatically displayed in a predetermined manner. For example, after each image is displayed as the active image, the image can be retained, in whole or in part, on the display screen as a context image, i.e., the active image leaves a trail of context images. Images can also be designated as context images by a user. In particular, as active images are displayed, the user can designate particular active images as context images.

25 Claims, 8 Drawing Sheets

PROVIDING VISUAL CONTEXT FOR A MOBILE ACTIVE VISUAL DISPLAY OF A PANORAMIC REGION

BACKGROUND OF THE INVENTION

1. Field of the Invention

This invention relates to a visual display of a panoramic region and, in particular, to such a visual display in which visual context is provided for an active display displayed in a mobile display window.

2. Related Art

It can be desirable to provide a display of the content of a spatial region that is larger than a field of view of a visual data acquisition device (e.g., video camera, video-enabled motion picture camera, still photo camera) that is to be used to obtain visual data representing an image within the spatial region. Herein, for convenience, such a display is sometimes referred to as a "panoramic display" and such a spatial region is sometimes referred to as a "panoramic region." Additionally, the visual data representing a single image obtained by a visual data acquisition device is referred to herein as a "frame" of visual data.

To produce a display that includes content covering a panoramic region, multiple frames of visual data must be obtained such that at least two of the frames of visual data correspond to spatial regions that are not coincident. Different types of displays can be produced, depending on characteristics of the frames of visual data, or the way in which the frames of visual data are used to generate a display.

For example, in one type of panoramic display (sometimes referred to herein as a "mobile active display"), a set of temporally sequential frames of visual data is used to generate the display. Each frame of visual data is used in sequence to produce a corresponding displayed image on a display screen. (Herein, "display screen" refers generally to any medium on which a visual display is presented.) Only one displayed image appears on the display screen at a time. (As used herein, a currently displayed image that is part of a sequence of images generated from temporally sequential frames of visual data is an "active image," the area of a display screen in which the active image is displayed is an "active window," and a display of a series of active images is an "active display.") Each displayed image is positioned on the display screen with respect to the position of other displayed images on the display screen in accordance with the spatial relationship in the panoramic region of the content of the displayed image to the content of the other displayed images. Thus, an active display is produced in which the active image is displayed in a display window that moves about the display screen in accordance with the content of the active image.

In another type of panoramic display (sometimes referred to herein as a "mobile static display"), a set of frames of visual data that represent images at the same point in time is used to generate a display. (Alternatively, a similar display can be generated from a set of frames of visual data obtained at different points in time if the content of the images represented by the frames remains essentially constant.) A series of images or sets of images corresponding to a sequence of adjacent frames or sets of frames (i.e., frames or sets of frames representing images that are most spatially proximate to each other in a particular direction), respectively, are successively displayed in a display window. The display window may or may not remain fixed on a display screen. If so, the fixed display window appears to open onto a scene that is passing by the display window. If not, the location of the display window on the display screen changes in accordance with the content of the image(s) in the display window so that the moving display window appears to open onto a fixed "hidden" scene. Thus, a display is produced in which different parts of a static panoramic image can be successively displayed in a display window.

In both of the above-described displays, as the display window shows different parts of a panoramic region, previously displayed content that can no longer be displayed in the display window is removed from the display screen. Consequently, context for the images displayed in the display window that might otherwise be provided by the removed content is lost (except insofar as a perception of the removed content is retained in the mind of a viewer). Since it can be desirable to provide such context, the above-described panoramic displays may not provide a viewing experience that is as enjoyable, rich and/or informational as desired. Additionally, the mobile static display does not provide the dynamism associated with the display of an active image, which, again, may limit the enjoyability, richness and/or informativeness of the viewing experience.

In still another type of panoramic display, an active display of a part of a panoramic region is positioned within a larger static display of the panoramic region. However, the frames of visual data used to produce the active display are different from the frames of visual data used to produce the static display, so that the two displays appear disjointed and otherwise unrelated to each other to an undesirable degree.

In yet another type of display (sometimes used in flight simulators), a small, relatively high resolution active display is positioned within a larger, relatively low resolution active display. However, the active displays are generated from sets of frames of visual data that must be acquired simultaneously by separate visual data acquisition devices, making the acquisition of visual data for such a display relatively expensive and complex. Further, the simultaneous display of both active displays requires expensive and/or complex display apparatus and methods to, for example, synchronously and seamlessly display both active displays.

SUMMARY OF THE INVENTION

The invention provides a visual display of a panoramic region in which visual context is provided for an active display displayed in a mobile display window. Active images are sequentially generated and displayed from temporally sequential frames of visual data, each frame of visual data representing an image defining a region within a larger panoramic region such that at least two of the images define regions that do not coincide. Each displayed image is positioned on a display screen in accordance with the location of the corresponding region within the panoramic region. At some time during the visual display, one or more context images (a context display) are displayed while an active image is displayed. (Typically, each context image, once displayed, is displayed for the remainder of the time that the visual display is produced.) Each context image is at least part of an image represented by a frame of the set of temporally sequential frames of visual data. Thus, a visual display is produced in which a static display provides context for an active display.

In one embodiment of the invention, context images are automatically displayed in a predetermined manner. For example, after each image is displayed as the active image, the image can be retained, in whole or in part, on the display screen as a context image, i.e., the active image leaves a trail of context images.

In another embodiment of the invention, one or more images are designated by a user and displayed as context image(s). For example, as active images are displayed, the user can designate particular active images to be context images. Typically, in this embodiment, less than all of the images displayed after a first display of a context image are included in the context display.

Content of overlapping context images can be displayed in any appropriate manner. For example, content of a context image that overlaps content of an earlier content image can replace the content of the earlier content image. Or, the overlapping content can be blended.

The invention can be implemented so that the location of a context image on the display screen can be moved by a user. (It is anticipated that this will be particularly advantageous in embodiments of the invention in which context images are user-designated.) Additionally, the invention can be implemented so that one or more of the context images can be designated as a clip sage which, upon selection, causes display of a series of active images beginning with the clip image. Further, if multiple sets of frames of visual data are available, branch points can be defined within the sets of frames of visual data, the branch points enabling transition between displays generated from different sets of frames of visual data.

The context display of a visual display according to the invention provides context for an active display that enhances the experience of watching the active display. For example, the context display can aid a viewer in locating an active display within a panoramic region from which the active display is drawn. The context display can also provide a "history" of the content of an active display.

Conversely, the presence of an active display within a context display of a visual display according to the invention can enliven a static display of a panoramic region. In particular, an active display within a static context display can provide what appears to be a relatively high degree of motion in a panoramic display (motion in the active display can induce a perception of motion in the static display) while requiring a relatively low amount of bandwidth for the visual data used to generate the display (the static part of the visual display does not need to be refreshed).

BRIEF DESCRIPTION OF THE DRAWINGS

FIG. 1 illustrates the visual display shortly after the display of active images has begun, when a context display is still relatively small compared to the size of the active display. FIG. 2 illustrates the visual display at a later time than that shown in FIG. 1, when the active display has moved across the display screen so that the context display has become larger. FIG. 3 illustrates the visual display at a later time than that shown in FIG. 2, after the active display has continued to move across the display screen in the same direction, then back in the opposite direction, so that context display regions are formed on either side of the active display.

FIG. 4 illustrates the visual display when the first active image is displayed. FIG. 5 illustrates the visual display at a later time than that shown in FIG. 4, when the active display is at a different location on the display screen and several context images are displayed on the display screen. FIG. 6 illustrates the visual display at a later time than that shown in FIG. 5, when the active display is at still another location on the display screen and even more context images are displayed on the display screen. FIG. 7 illustrates the visual display after completion of the active display, with all of the designated context images displayed on the display screen.

DETAILED DESCRIPTION OF THE INVENTION

Figure 1:
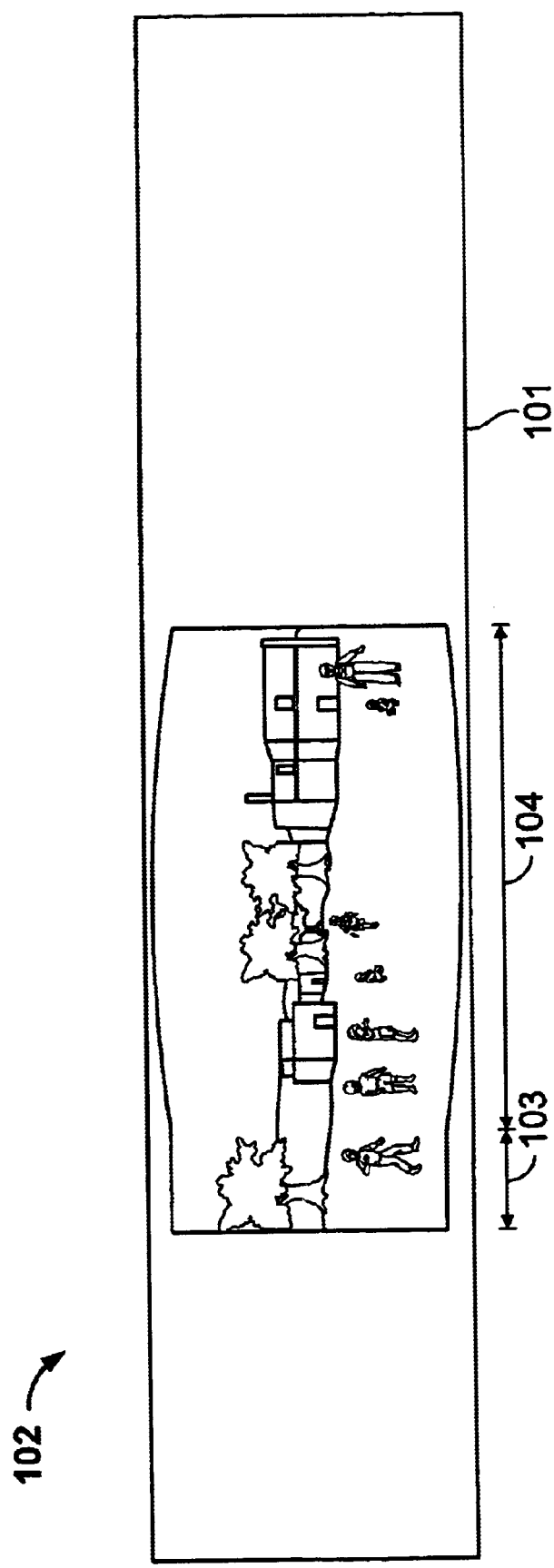
FIGS. 1, 2 and 3 illustrate an embodiment of a visual display according to the invention on a display screen.

The invention provides a visual display of a panoramic region in which visual context (a "context display," as defined below) is provided for an active display (as defined above) displayed in a mobile display window. The visual display so produced provides an enjoyable and rich viewing experience that has not been captured by previous visual displays. The visual display also provides additional information to a viewer that can enhance viewing of the active display.

A visual display according to the invention is produced from a set of temporally sequential frames of visual data that represent images from a panoramic region, each image defining a region within the larger panoramic region such that at least two of the images define regions that do not coincide. Images are sequentially generated and displayed from temporally sequential frames of visual data (i.e., a series of active images are displayed). Each displayed image is positioned on a display screen with respect to the position of other displayed images on the display screen in accordance with the spatial relationship in the panoramic region of the content of the displayed image to the content of the other displayed images. At some time during the visual display, while an active image is displayed, at least part of a different image represented by a frame of the set of temporally sequential frames of visual data is displayed. (Such a complete or partial previously displayed image is referred to herein as a "context image." One or more context images is sometimes referred to herein as a "context display.") Typically, though not necessarily, each context image, once displayed, is displayed for the remainder of the time that the visual display is produced.

A visual display according to the invention can be displayed on any appropriate display device, such as, for example, a computer display monitor or a television. Additionally, in general, the generation of the visual display from the frames of visual data can be accomplished using any of a variety of methods and apparatus appropriate for the particular display device being used, as are well known to those skilled in the art.

In general, the temporally sequential frames of visual data can be obtained using any visual data acquisition device (e.g., video camera, video-enabled motion picture camera, still photo camera). (For convenience, a visual data acquisition device used to obtain frames of visual data for use in producing a visual display according to the invention is sometimes referred to herein as a "camera;" however, it is to be understood that the use of such term does not limit the types of devices that can embody the visual data acquisition device.) The frames of visual data can be obtained as either analog or digital data. If the frames of visual data are represented as analog data, the frames of analog visual data are converted to frames of digital visual data using conventional apparatus and techniques.

Frames of visual data for use in producing a visual display according to the invention can be obtained by operating a visual data acquisition device and acquiring successive frames of visual data at the frame rate of the visual data acquisition device. In general, the acquired frames of visual data can be stored (using any of a variety of known conventional storage devices) for use in later producing a visual display, or the acquired frames of visual data can be used immediately to produce a real-time visual display. In the latter case, depending on the particular implementation of the invention, the user can be allowed to control the acquisition of frames of visual data by the camera (i.e., the content of the active display), such as by, for example, controlling the filming direction of the camera.

Typically, the set of temporally sequential frames of visual data includes all of the frames of visual data so obtained. However, a set of temporally sequential frames of visual data can be formed by omitting one or more of the frames of visual data obtained in such manner. For example, it may be desired to omit certain frames in a regular manner (e.g., every other frame, every third frame, every fourth frame, etc.). This may be necessary or desirable, for example, to enable production of a real-time visual display, if the apparatus used to generate the visual display operates at a speed such that frames of visual data cannot be processed quickly enough to keep up with the acquisition of new frames of visual data by the visual data acquisition apparatus.

To enable generation of a display in accordance with invention, camera metric data must also be acquired or derived, in addition to acquisition of the temporally sequential frames of visual data. The camera metric data describes the position (i.e., the location and orientation) of the camera—and, thus, the point of view of the camera at the time that each frame of visual data is acquired. In general, the camera can be mounted so that each of the location and the orientation of the camera can be varied within a one-, two- or three-dimensional coordinate system (i.e., has one, two or three degrees of freedom). In a particular embodiment of the invention, a camera is mounted at a fixed location such that the camera can be rotated about each of three orthogonal axes (e.g., pan, tilt and rotational axes) to establish an orientation. Mounting the camera at a fixed location advantageously simplifies the calculations required to later position each image on a display screen. Allowing rotation about three orthogonal axes enables visual data to be obtained without undue restriction on the ability to obtain visual data regarding the entire panoramic region.

Camera metric data describing the position at which each visual frame was acquired can be obtained in any of several ways. For example, a position sensing device or devices can be connected to a movable camera mount. Illustratively, one or more potentiometers can be connected to a rotational camera mount to measure the rotational position of the camera mount (and thus the orientation of the camera), as known by those skilled in the art. Similarly, one or more odometers (or similar distance measuring device) can be connected to a translational camera mount (e.g., a dolly on which the camera is positioned) to measure the translational position (by measuring the distance travelled in a particular direction from a known starting location) of the camera mount (and thus the location of the camera), as known by those skilled in the art.

Camera metric data can also be obtained by moving the camera in a prescribed path with a predetermined velocity profile (e.g., panning the camera at a constant speed). Together with knowledge of the starting location and/or orientation of the camera, and the frame rate at which frames of visual data are acquired by the camera, the location and/or orientation of the camera at the time of acquisition of each frame can be determined.

Camera metric data can also be obtained (at least implicitly) using an image analysis technique. After the frames of visual data have been acquired, temporally successive frames can be compared to each other and positioned on a display screen so that the corresponding images blend together seamlessly (or as nearly seamlessly as possible or desired). Techniques for performing such image analysis are known to those skilled in the art. Once one image is displayed, all subsequent images are displayed at relative locations on the display screen in accordance with such image analysis. (The use of image analysis does not require that camera metric data ever be identified explicitly; however, if the location and/or orientation of the camera at which one of the frames was acquired is known, the image comparisons can be used to determine the location and/or orientation of the camera at the time of acquisition of each of the other frames.)

Once the temporally sequential frames of visual data and the camera metric data have been obtained, the visual display can be produced. In general, the visual display can begin with generation of a displayed image from any of the frames of visual data. Often, however, the visual display will begin with generation and display of the image represented by the first-acquired frame of visual data.

After the display of a first image, successive images (active images) are generated and displayed from frames of visual data that are temporally adjacent to the frame of visual data from which the most recently displayed image was generated. If the frames of visual data have been obtained and are displayed at a sufficiently high rate, successive display of active images will produce a display in which it appears that motion occurs (if motion was occurring in the part of the panoramic region represented by the active image) in the active window (i.e., the area of the display screen in which the active image is displayed). In general, each active image can be temporally prior to (the visual display moves temporally backward), or after (the visual display moves temporally forward), the immediately previously displayed active image, i.e., the active display can move temporally forward or backward in any prescribed manner.

As indicated above, each active image is positioned on a display screen with respect to the position of other displayed images on the display screen in accordance with the spatial relationship in the panoramic region of the content of the active image to the content of those other displayed images. In general, it is desirable that the images be positioned on the display screen so that overlapping images (i.e., images that at least partly include content from the same spatial region) that are temporally adjacent are displayed as seamlessly as possible or as necessary to avoid undesirable discontinuity in the display of the overlapping images. (This can be accomplished relatively easily when the visual data is obtained by a camera that pivots about a single axis, as discussed elsewhere herein.) Proper relative positioning of each image on the display screen is accomplished using the camera metric data and techniques known to those skilled in the art. (In some embodiments of the invention, the user may be provided with the capability to move context images, as described further below.)

It may also be necessary or desirable to process the frames of visual data, prior to generating the visual display, to, for example, increase the fidelity of the visual display. For example, it is expected that the invention will often be used to produce a visual display on a two-dimensional display screen. It is further contemplated that the frames of visual data from which the visual display will be generated will often be obtained using a camera that pivots about a nodal point. (Examples of such a visual display are shown below in FIGS. 1–9.) In such case, it may be necessary or desirable to perform a cylindrical correction to the frames of visual data in accordance with the lens characteristics of the camera, as known to those skilled in the art, to minimize or eliminate distortion of the visual display (e.g., to ensure convergence of perspective lines in temporally successive images), and/or to enable a seamless or nearly seamless display of overlapping context images.

According to the invention, as active images are successively displayed, one or more context images (i.e., a complete or partial previously displayed image) can be retained as part of the visual display. Each context image is static. In contrast, as described above, motion can appear to occur in the active window in which the active image is displayed. Thus, in a visual display according to the invention, one or more static images provide context for an active image that, in many cases (depending upon whether motion occurred at that time in that part of the panoramic region), is a moving image.

In general, part or all of any previously displayed active image can be retained in the visual display as a context image. Context images can be retained in any appropriate manner. For example, as described and illustrated further below with respect to FIGS. 1–9, context images can be retained automatically or as a result of user designation.

As will be apparent from the illustrations of a visual display according to the invention in FIGS. 1–9 below, context images can sometimes overlap in a visual display according to the invention. Such overlapping can be accommodated, for example, by replacing the content of an earlier-displayed context image with overlapping content from the later-displayed context image. Alternatively, overlapping content of context images can be blended and the resultant blended content displayed in place of the content from either of the overlapping context images. Methods for accomplishing such blending are known to those skilled in the art.

Additionally, in general, context images can be retained in the visual display for any length of time. It is anticipated that in many embodiments of the invention, the context images, once displayed, will be displayed for the remainder of the duration of the visual display. However, this need not be the case. A visual display in accordance with the invention could be embodied so that context images, after initial display, are displayed for a predetermined duration of time.

The visual display can be controlled automatically or the visual display can be controlled interactively by a viewer or other person enabled to control the visual display (herein referred to as a "user"). A variety of aspects of the visual display can be controlled, such as, for example, the beginning active image, the temporal direction(s) in which successive active images are displayed, the selection of context images (including the beginning of automatic generation of context images), and the termination of display of additional active images. As mentioned above and described further below, in some embodiments, the user can control the position of one or more context images on the display screen. The user may also be able to designate and/or select one or more "clip" images (discussed further below). User control of the visual display can be effected using any appropriate input device or devices, such as a mouse, keyboard, trackball, stylus, joystick or Trackpoint™ mechanism.

Figure 2:
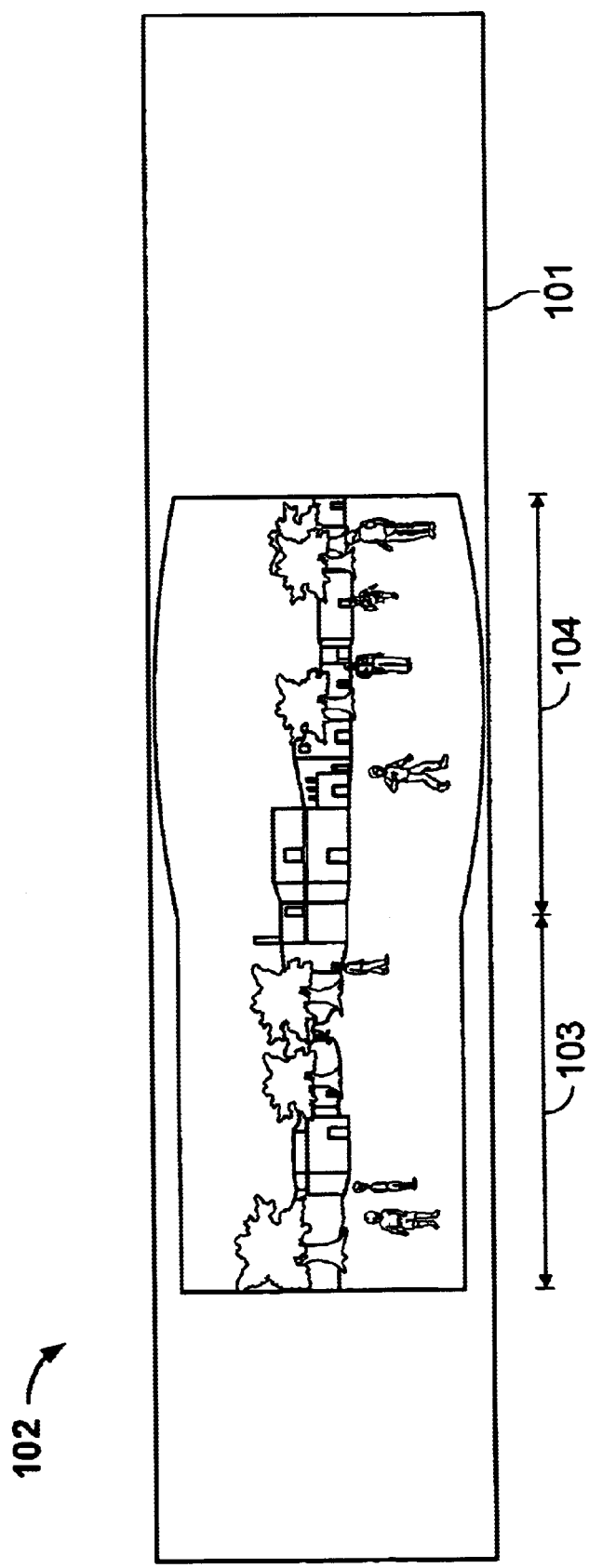
Figure 3:
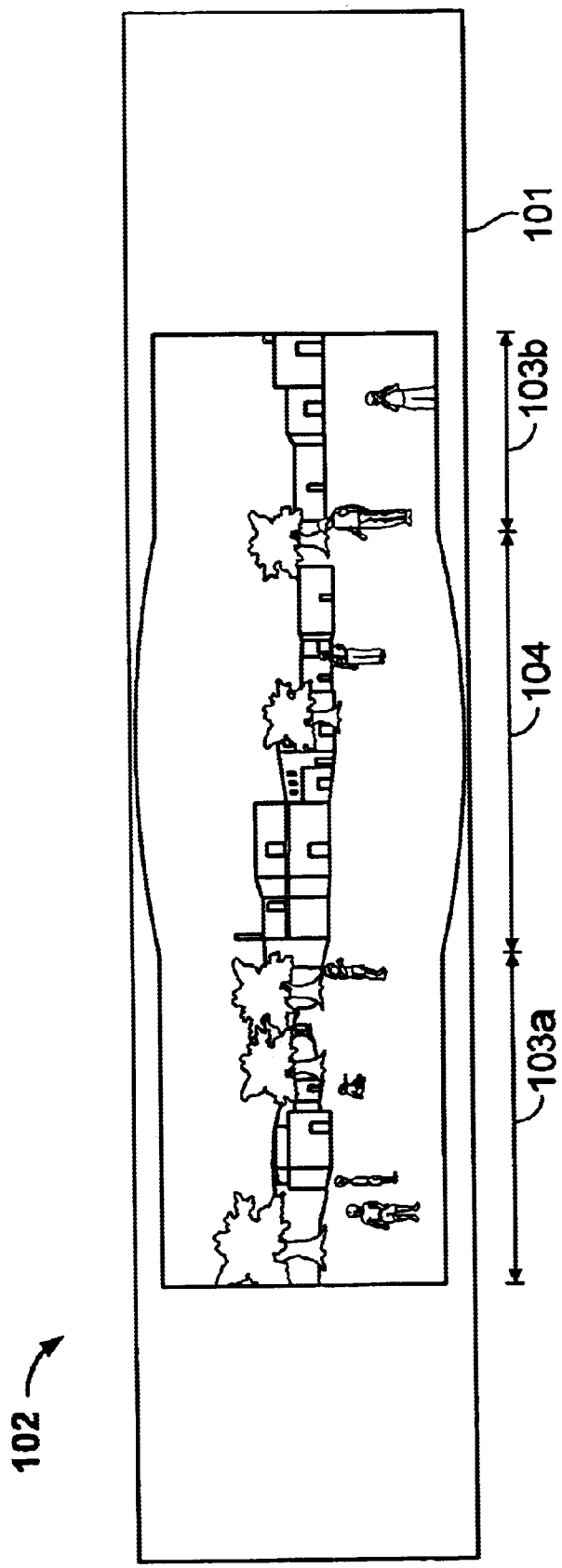

FIGS. 1, 2 and 3 illustrate an embodiment of a visual display according to the invention. A visual display 102 is presented on a display screen 101. As can be seen in FIGS. 1, 2 and 3, the frames of visual data used to produce the visual display 102 represent images obtained as a camera was panned about a single nodal point. (More generally, a visual display according to this embodiment of the invention can be generated from frames of visual data obtained in other ways, e.g., panning and tilting a camera about a single nodal point, translating a camera that does not pan, tilt or rotate, etc.) In each of FIGS. 1, 2, and 3, the area indicated by the bi-directional arrow 104 is the active window within which an active image is displayed (referred to hereinafter as the active display 104). The bulges at the top and bottom of the active window are a consequence of performance of a cylindrical correction to preserve the fidelity of the active image. (Incidentally, the bulges also enable the active display 104 to be clearly identified in FIGS. 1, 2 and 3.) The area indicated in each of FIGS. 1 and 2 by the bi-directional arrow 103, and the areas indicated in FIG. 3 by the bidirectional arrows 103a and 103b, are one or more context images (referred to hereinafter as the context display 103).

The visual display 102 can be produced as follows. Beginning with a predetermined frame of visual data, images are sequentially generated and displayed from temporally sequential frames of visual data, as described above. However, rather than refreshing the display screen 101 after the display of each image, the display screen 101 is not refreshed, so that each displayed image remains on the display screen 101. Thus, a trail of context images is left on the display screen 101 as new active images are generated and displayed. (The actual content of the context display 103 is discussed further below.)

FIG. 1 illustrates the visual display 102 shortly after the display of active images has begun, when the context display 103 is still relatively small compared to the size of the active display 104. For convenience, it will be assumed that the frames of visual data were obtained by continuously panning the camera to the right (as viewed in FIGS. 1, 2 and 3). However, this need not necessarily have been the case: more generally, the camera could have been panned over time in any manner from right to left.

FIG. 2 illustrates the embodiment of a visual display according to the invention shown in FIG. 1 at a later time than that shown in FIG. 1. As additional temporally subsequent frames of visual data are used to generate and display active images, the active display 104 moves progressively to the right on the display screen 101, leaving a trail of context images. As can be seen, many more context images are now present in the visual display 102, depicting a larger part of the panoramic region.

FIG. 3 illustrates the embodiment of a visual display according to the invention shown in FIGS. 1 and 2 at a later time than that shown in FIG. 2. At first, as additional temporally subsequent frames of visual data are used to generate and display active images, the active display 104 continues to move progressively to the right on the display screen 101. However, eventually, either automatically or as a result of user instruction, the active display 104 begins moving back to the left on the display screen 101 in accordance with the manner in which the frames of visual data were obtained. Since, as indicated above, it is being assumed that the frames of visual data were acquired as a result of the camera continuously panning to the right, movement of the active display 104 to the left means that the active images are moving backward in time. However, this need not necessarily be the case: if the frames of visual data were acquired by panning the camera back to the left, then movement of the active display 104 to the left would occur as the active images continue to move forward in time. In FIG. 3, leftward movement of the active display 104 results in a visual display 102 that includes two context display regions 103a and 103b separated by the active display 104.

As described above, in the visual display 102, each displayed image remains on the display screen 101 as subsequent active images are generated and displayed. When a new active image is displayed, any content of a previously displayed image located on the display screen 101 within the active window is replaced by the content of the new active image. Any content of a previously displayed image located outside of the active window remains on the display screen. Thus, the context display 103 is a composite static image including the most temporally recent content at each location within the panoramic region.

The set of frames of visual data used to produce the visual display shown in FIGS. 1–3 (or, more generally, any set of frames of visual data used to produce a visual display according to the invention) can be used in a different manner to produce a visual display according to the invention that is similar to, but different from, the visual display shown in FIGS. 1–3. Such a visual display includes a fixed context display that includes content from all parts of the panoramic region from which images were obtained, i.e., the context display is produced from all of the frames of the set of frames of visual data. Such a context display can be produced by displaying content at each part of the context display that is the content from the temporally latest frame of visual data that includes content at that part of the panoramic region. (Alternatively, some other rule for mediating among overlapping frames of visual data could be used, such as using the content from the temporally earliest frame of visual data.) Such a context display can also be produced by blending the overlapping parts of the frames of visual data, as discussed elsewhere herein. An active display is generated and displayed as discussed above, the active display appearing to be seamlessly integrated within a larger static panorama (the context display).

A visual display according to the invention can provide several desirable effects. First, the context display provides context for the active display which can, for example, aid a viewer in locating the active display within a panoramic region from which the active display is drawn and/or provide a history of the content of the active display. Second, the active display can enliven a static display of a panoramic region (the context display). This may, in particular, be useful to enable provision of a visual display having the appearance of a relatively high degree of motion in proportion to the bandwidth capacity required for transmission of the visual data used to generate the display.

FIGS. 4, 5, 6 and 7 illustrate another embodiment of a visual display according to the invention. In each of FIGS. 4, 5, 6 and 7, a visual display 402 is presented on a display screen 401.

Figure 4:
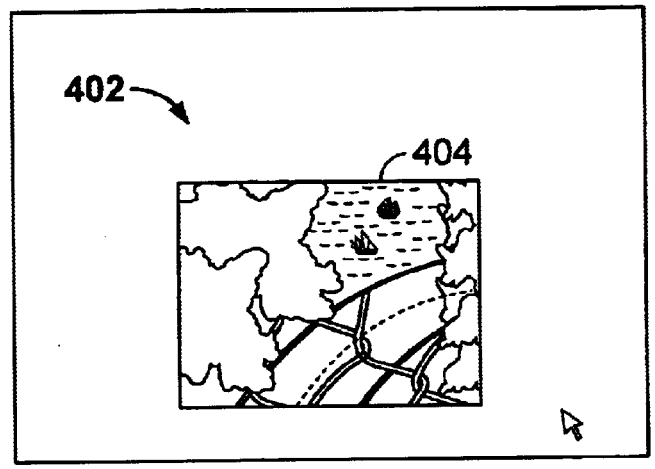
FIGS. 4, 5, 6 and 7 illustrate an embodiment of a visual display according to the invention on a display screen.

FIG. 4 illustrates the visual display 402 when a first active image is displayed. In this embodiment of the invention, until a user designates an active image to be displayed as a context image, as discussed further below, only the active display 404 is displayed on the display screen 401. (Also shown in FIG. 4 is a pointer icon—the location of which can be moved using a mouse or comparable device, as is well known—that facilitates the designation of context images.)

Figure 5:
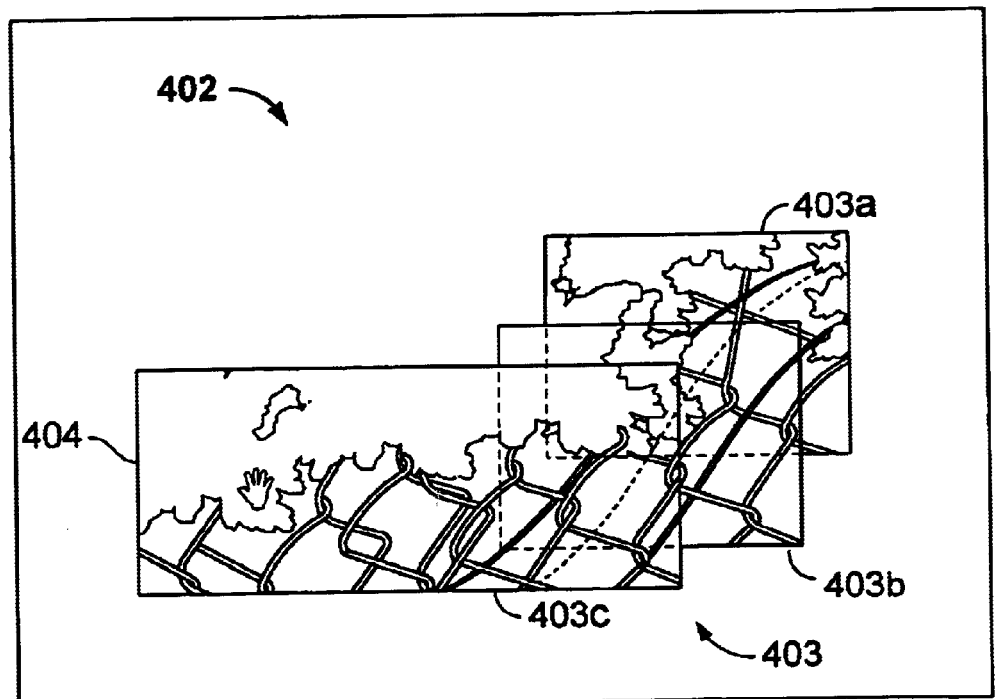

FIG. 5 illustrates the visual display 402 at a later time than that shown in FIG. 4, when the active display 404 is displayed at a different location on the display screen 401. The location of the active display 404 on the display screen 401 is determined using camera metric data, as discussed above, so that the active image in FIG. 4 and the active image in FIG. 5 are spatially related to each other on the display screen 401 in the same manner as the parts of the panoramic region that those active images represent.

In FIG. 5, several context images (e.g., context images 403a, 403b and 403c) are displayed on the display screen 401: together, the displayed context images are the context display 403. According to this embodiment of the invention, as successive active images are displayed, a user can provide an instruction to the display system indicating that the current active image is to be displayed as a context image. Thus, the user can create a desired context display 403, i.e., a context display 403 that includes context images as specified by the user. (The visual display produced in accordance with this embodiment of the invention becomes equivalent to the visual display produced in accordance with the embodiment of the invention illustrated above with respect to FIGS. 1, 2 and 3 if the user specifies retention of context images at the effective frame rate at which the visual display is generated, so that all active images are specified as context images.)

The specification of an instruction that designates a context image can be implemented using any of a variety of well known user input devices and techniques, as can be readily appreciated by those skilled in the art. For example, a context image can be designated by clicking a mouse or pressing a key on a keyboard. Further, designation of a context image may require that an icon (e.g., the pointer icon shown in FIGS. 4, 5 and 6) associated with the input device be positioned within the active window (by, for example, moving the mouse or using the cursor keys on the keyboard). This may be desirable, for example, as a means to reduce the incidence of accidental designation of context images through inadvertent mouse clicks or key depressions, since such requirement generally necessitates more conscious action on the part of the user to manifest a desire to designate a context image. (The changing of the pointer icon in FIG. 5—as well as in FIG. 6, discussed below—from an arrow to a hand indicates that the active image is being designated as a context image.)

To facilitate description of the creation of a visual display in accordance with this embodiment of the invention, it will be assumed that the frames of visual data were acquired so that, during the time between the visual display 402 of FIG. 4 and the visual display 402 of FIG. 5, the active display 404 moved gradually down and to the left (as viewed in FIGS. 4 and 5), so that the context image 403a was designated first, followed in succession by the context image 403b and the context image 403c. In accordance with the invention, the context display 403 of FIG. 5 provides some context for the active display 404 (e.g., a "history" of the content of the active display 404, a spatial reference for the active display 404, etc.). Moreover, the presence of the context images may facilitate perception by a viewer of content that is not explicitly displayed in the visual display 402, i.e., the context display 403 can enable additional context for the active display 404 to be implied.

Figure 6:
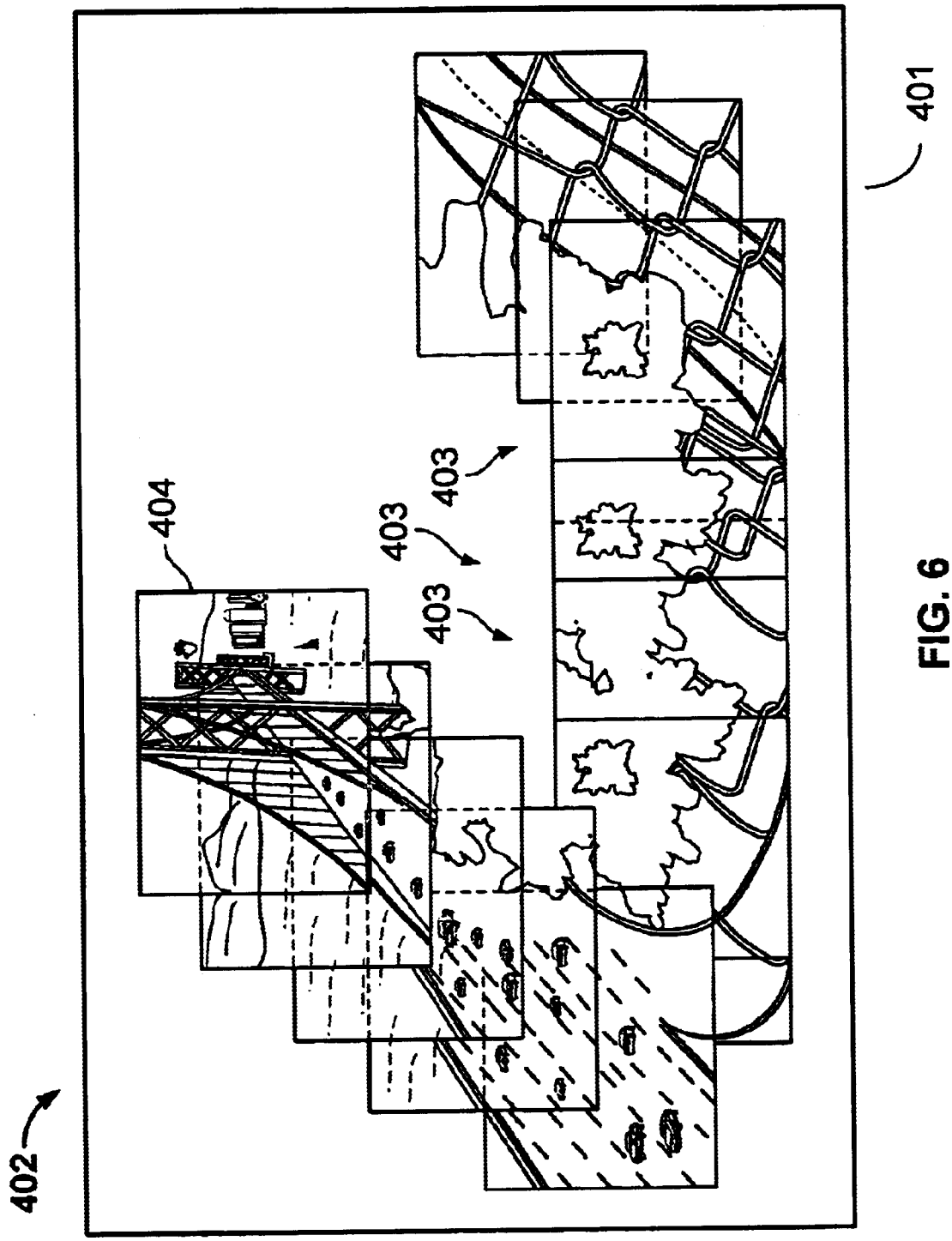

FIG. 6 illustrates the visual display 402 at a still later time than that shown in FIG. 5, when even more context images are displayed on the display screen 401. In FIG. 6, the context display 403 continues to provide a history of the content of the active display 404. Additionally, the context display 403 of FIG. 6 forms a more complete composite picture, as compared to the context display 403 of FIG. 5, of the panoramic region from which the active display 404 is drawn.

Figure 7:
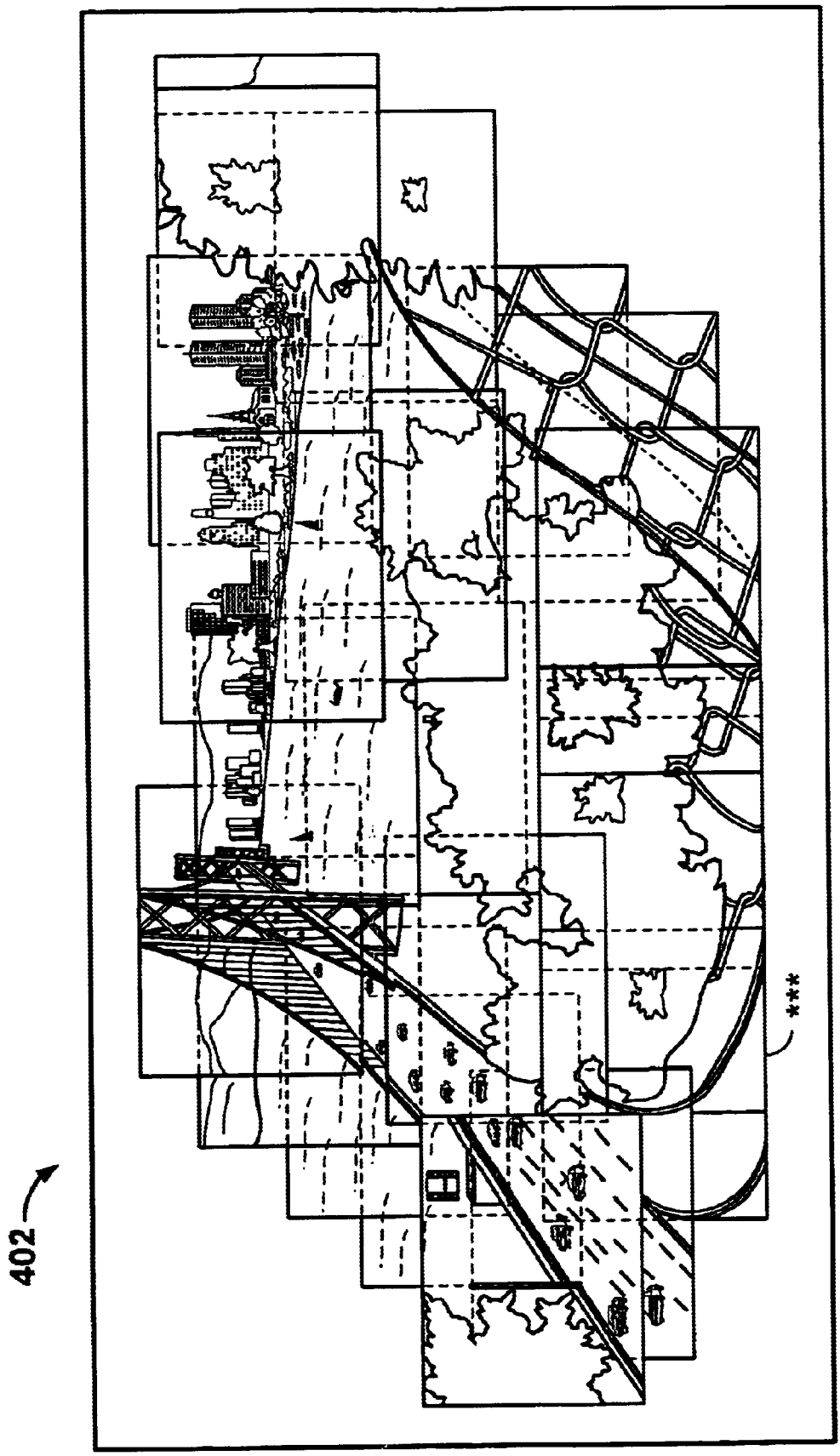

FIG. 7 illustrates the visual display 402 after display of the active image corresponding to the last frame in the set of temporally sequential frames of visual data used to produce the visual display 402. In FIG. 7, the context display 403 forms a "complete" composite picture of the panoramic region. As illustrated in FIG. 7, context images that overlap or are adjacent to each other need not be temporally proximate: for example, in the lower left part of the visual display 402, several context images have replaced all or part of several previously designated context images in that portion of the visual display 402 (see FIG. 6). Further, as is evident in each of FIGS. 5, 6 and 7, the content of context images that overlap or are adjacent to each other is not blended in any way; rather, each successive context image overlays any previously designated context image(s) in that area of the display screen 401. Thus, as illustrated in FIG. 7, as more context images are designated in a visual display according to this embodiment of the invention, the utility of the context images as a history of the active image may tend to diminish, since it can become more difficult to mentally place context images relative to each other in time. Additionally, as illustrated in FIG. 7, while the display of an increasing number of context images tends to more fully display the general content of the panoramic region, there is no attempt to maintain continuity of the content of that display. However, the lack of blending of overlapping and adjacent images can create interesting visual effects and eliminates processing having a relatively high computational cost.

As mentioned above, the invention can be implemented so that context images can be moved about on the display screen by a user. While, in general, any embodiment of the invention can include this capability, it is anticipated that such capability is most desirable in embodiments of the invention in which context images are designated by a user, as illustrated in FIGS. 4–7. The ability to move context images about on the display screen can be desirable, for example, to enable the user to improve the seamlessness of the context display or to enable the user to create a desired collage of context images. The capability to move context images about on the display screen can be implemented in any of a variety of well known ways, as known to those skilled in the art. For example, a user input device (e.g., mouse) can be used to point, click and drag images from one location on the display screen to another.

The invention can also be implemented so that one or more context images can be specified as "clip images." As used here, "clip image" indicates a context image which, if "selected" by a user, causes a display of successive active images (a "clip"), beginning with the clip image, for a prescribed amount of time. As can be appreciated, the specification, selection and display of clip images can be enabled in any of a variety of manners. For example, an image can be specified as a clip image at the time that the image is retained as a context image, or at a later time (e.g., when the active display has been stopped or paused). The duration of a clip can be specified, for example, by enabling specification of an image as the last image in the clip (again, either during the initial display of the image or at a later time), by enabling a duration of time to be specified explicitly, or by establishing a default duration of time for each clip. The selection of a clip image can be implemented using conventional mouse point and click techniques.

Figure 8:
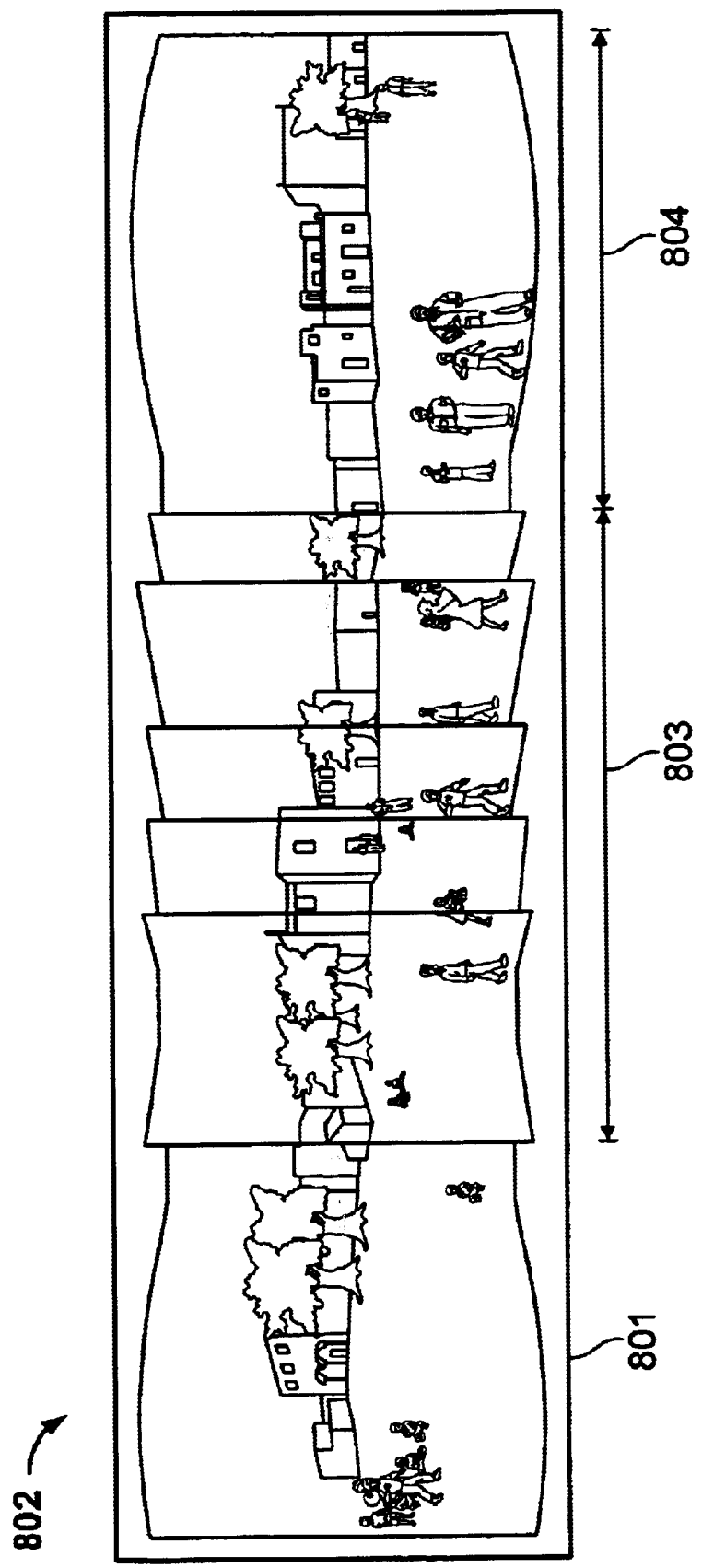
FIG. 8 illustrates an embodiment of the invention that combines aspects of the embodiments described above with respect to FIGS. 1–3 and FIGS. 4–7.

FIG. 8 illustrates an embodiment of the invention that combines aspects of the embodiments described above with respect to FIGS. 1–3 and FIGS. 4–7. A visual display 802 is presented on a display screen 801. As in the visual display 102 of FIGS. 1, 2 and 3, the frames of visual data used to produce the visual display 802 represent images obtained as a camera was panned about a single nodal point. In FIG. 8, in the area indicated by the bi-directional arrow 803, parts of several images are displayed as context images as a result of user-designation of those images as context images (in a manner in accordance with the description above with respect to FIGS. 4–7). In the area indicated by the bi-directional arrow 804, a trail of context images (present at the left of the area 804) is produced automatically (in a manner in accordance with the description above with respect to FIGS. 1–3). The integration of such automatic and user-initiated generation of context images can readily be implemented by those of skill in the art in view of the description herein.

FIG. 8 also illustrates another possible modification of a visual display according to the invention. Though the embodiments of the invention described and illustrated above have included a single active display, a visual display according to the invention can include multiple active displays. This is shown in FIG. 8: the bulged sections at the leftmost and rightmost parts of the visual display 802 are each an active display.

In general, the integration of multiple active displays in a single visual display can be accomplished in a variety of ways and can be implemented by those of skill in the art in view of the description herein. When multiple active displays are generated from different sets of frames of visual data, it is anticipated that it will typically be desirable to locate multiple active displays on a display screen so that the active displays—and the context displays associated therewith—do not overlap. (However, this need not necessarily be the case.) On the other hand, multiple active displays can be generated from different parts of the same set of frames of visual data; in that case, the active displays (and associated context displays) will overlap to the extent that they include content from overlapping parts of the panoramic region.

A user can be provided with the capability to control one, some or all of multiple active displays. Generally, the control capabilities for each display can be the same as those for a single active display, as described above. User control of multiple active displays can be implemented by those of skill in the art in view of the description herein.

Figure 9:
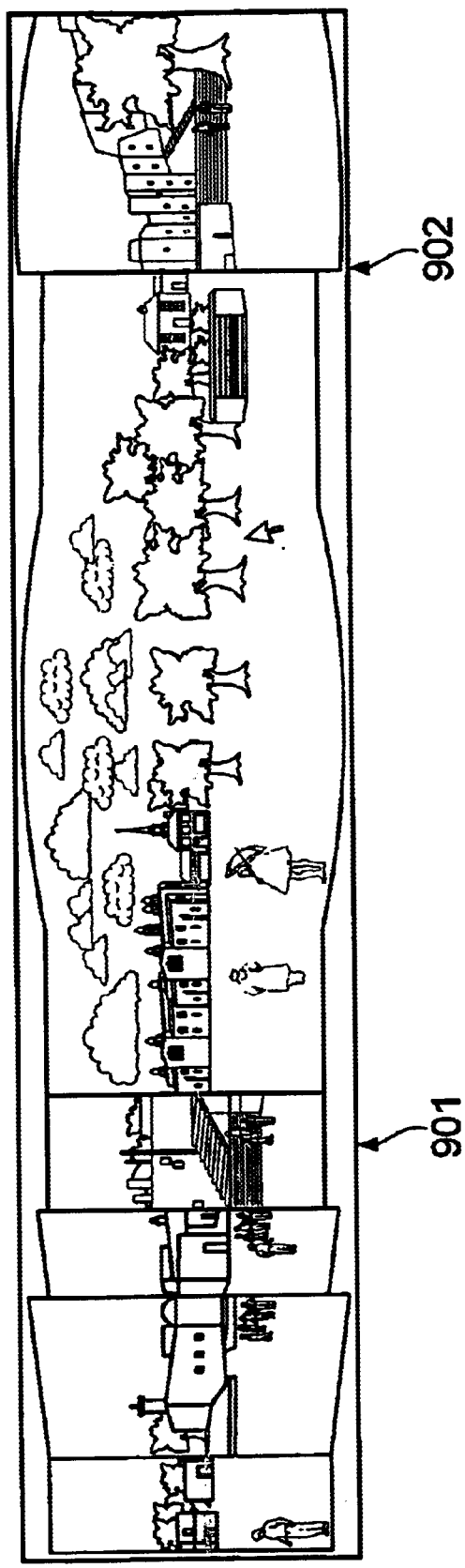
FIG. 9 illustrates a further embodiment of a visual display according to the invention, which includes images from different panoramic regions.

FIG. 9 illustrates a further embodiment of a visual display according to the invention. A visual display 902 is presented on a display screen 901. The visual display 902 includes images from different panoramic regions and is produced as explained further below. As in the visual display 102 of FIGS. 1, 2 and 3, and the visual display 802 of FIG. 8, the frames of visual data used to produce the visual display 902 represent images obtained as a camera was panned about a single nodal point. Additionally, like the visual display 802 of FIG. 8, the visual display 902 of FIG. 9 combines automatic and user-initiated generation of context images.

To produce a visual display as shown in FIG. 9, multiple sets of temporally sequential frames of visual data must be available for use in generating and displaying images. A visual display of images corresponding to one of the sets of frames of visual data begins and is produced as described above. However, at particular points ("branch points") within that set of frames of visual data, further display of active images can continue using the frames of that set of frames of visual data or using the frames of a different set of frames of visual data. If the latter is chosen (either automatically or at the instruction of a user), the active display continues using a frame of visual data corresponding to a predefined point (also referred to as a "branch point") within that set of frames of visual data. Such transitions are shown in FIG. 9 at the locations indicated by the numerals 901 and 902.

As illustrated in FIG. 9, context images generated from a set of frames of visual data that is different from the set of frames of visual data being used to generate the active image remain as part of the visual display. (In FIG. 9, the context images to the left of location 901 and to the right of location 902 are from panoramic regions that are different from the panoramic region from which the images, including the active image, between the locations 901 and 902 are taken.) However, a visual display in which transition is made at a branch point from one set of frames of visual data to another set of frames of visual data can be implemented in other ways. For example, switching from one set of frames of visual data to another set of frames of visual data may cause all images from the previous set of frames of visual data to be removed from the visual display. Or, in an embodiment of the invention in which a fixed context display is generated from all of the frames of a set of frames of visual data (as described above), switching to a new set of frames of visual data at a branch point can cause display of a new fixed context display that is generated from all of the frames of the new set of frames of visual data.

As can be appreciated, in general, any number of branch points can be defined within a set of frames of visual data. Further, any number of sets of frames of visual data can be provided to which a transition can be made. Additionally, any desired rules can be established governing the manner in which transitions are made between sets of visual data (e.g., identifying corresponding branch points within different sets of frames of visual data, determining to which of multiple sets of frames of visual data to transition).

As illustrated in FIG. 9, the different sets of frames of visual data are obtained from different panoramic regions. However, a display as described above with respect to FIG. 9 could also be produced from different sets of frames of visual data that are obtained from the same panoramic region (and, in fact, from the same point of view) at different times (e.g., different times during a day, such as morning, afternoon and evening).

The presence of a branch point in the visual display can be indicated in any appropriate manner. For example, an image representing a branch point can be outlined. Or, a branch point image can be indicated by the appearance of a particular icon or other graphical character.

The selection of a branch point in the visual display can also be enabled in any appropriate manner. For example, clicking on a branch point image can cause switching to a new set of frames of visual data. Or, controlling the active image in a particular way (e.g., causing the active image to pan in one direction or another) can cause a particular set of frames of visual data to be selected at a branch point.

As can readily be appreciated, an audio display can accompany a visual display according to the invention. In such case, typically, the content of the audio display will correspond to the content of the visual display.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A method for producing a visual display of a panoramic region from a set of temporally sequential frames of visual data, each frame of visual data representing an image defining a region within the panoramic region such that at least two of the images define regions that do not coincide, the method comprising the steps of:

displaying a series of active images generated from multiple temporally sequential frames of visual data, such that the series of active images comprise a moving video image of at least those portions of successive frames of visual data that overlap;

obtaining camera metric data for generating the visual display including time information, wherein the visual display may be temporally and spatially modified by panning;

positioning each displayed image on a display screen with respect to the position of other displayed images on the display screen in accordance with the spatial relationship in the panoramic region of the content of the displayed image to the content of the other displayed images; and displaying one or more context images while said series of active images is displayed, each context image being at least part of an image represented by a previously displayed frame of the set of temporally sequential frames of visual data, said frame no longer corresponding to an active image such that the context image is displayed as a static image;

whereby the one or more context images are displayed statically to provide a context display for the series of active images displayed as a moving video image and an active display including the series of active images.

2. A method as in claim 1, wherein the step of displaying one or more context images further comprises automatically displaying one or more context images in a predetermined manner.

3. A method as in claim 2, wherein each context image is at least part of an active image displayed prior to the display of a current active image.

4. A method as in claim 3, wherein the step of displaying one or more context images further comprises displaying each image displayed after a first display of a context image.

5. A method as in claim 1, wherein the step of displaying one or more context images further comprises displaying an image designated by a user as a context image.

6. A method as in claim 5, wherein the step of displaying one or more context images further comprises displaying a previously displayed image designated by a user as a context image.

7. A method as in claim 5, further comprising the step of designating an image as a context image I accordance with user instruction.

8. A method as in claim 7, wherein the step of designating further comprises designating an image as a context image at the time that the image is displayed as an active image.

9. A method as in claim 5, further comprising the step of moving the location of a context image on the display screen in accordance with user instruction.

10. A method as in claim 1, wherein one or more of the context images is designated as a clip image.

11. A method as in claim 10, further comprising the step of designating a context image as a clip image in accordance with user instruction.

12. A method as in claim 10, further comprising the step of selecting a clip image, wherein selection of a clip image causes the step of generating an active image to begin with the selected clip image.

13. A method as in claim 1, wherein the visual display can be generated from a plurality of sets of temporally sequential frames of visual data, each frame of visual data within a set of frames of visual data representing an image defining a region within a corresponding panoramic region such that at least two of the images define regions in that panoramic region that do not coincide, at least one branch point being defined in each set of frames of visual data, the method further comprising the steps of:

identifying a branch point in a set of frames of visual data from which active images are being displayed when a branch point is identified, determining whether to display images generated from a new set of frames of visual data;

if images are to be generated from a new set of frames of visual data, identifying a new set of frames of visual data and the frame within the new set of frames of visual data with which to begin the display of active images; and generating a display of an active image from each of multiple temporally sequential frames of visual data in the new set of frames of visual data.

14. A method as in claim 1, wherein content of a context image that overlaps content of an earlier context image replaces the content of the earlier context image.

15. A method as in claim 1, wherein the set of temporally sequential frames of visual data is obtained by a visual data acquisition device rotatably mounted at a fixed location.

16. A method as in claim 1, wherein the frames of visual data are prerecorded.

17. A method as in claim 1, wherein the frames of visual data are acquired and used to generate an active image in real time.

18. A visual display of a panoramic region, comprising:

an active display comprising a series of active images that are generated from temporally sequential frames of visual data, wherein:

each frame of visual data represents an image defining a region within the panoramic region such that at least two of the images define regions that do not coincide;

camera metric data for generating the visual display including time information, wherein the visual display may be temporally and spatially modified by panning;

each displayed image is positioned on a display screen with respect to the position of other displayed images on the display screen in accordance with the spatial relationship in the panoramic region of the content of the displayed image to the content of the other displayed images; and a context display comprising one or more context images displayed while an active image is displayed, each context image being at least part of an image represented by a previously displayed frame of the set of temporally sequential frames of visual data, said frame no longer corresponding to an active image such that the context image is displayed as a static image.

19. A visual display as in claim 18, wherein content of a context image that overlaps content of an earlier-displayed context image replaces the content of the earlier-displayed context image.

20. A visual display as in claim 18, wherein the set of temporally sequential frames of visual data is obtained by a visual data acquisition device rotatably mounted at a fixed location.

21. A visual display as in claim 18, wherein all of the images displayed after a first display of a context image are displayed as context images.

22. A visual display as in claim 18, wherein less than all of the images displayed after a first display of a context image are displayed as context images.

23. A system for producing a visual display of a panoramic region from a set of temporally sequential frames of visual data, each frame of visual data representing an image defining a region within the panoramic region such that at least two of the images define regions that do not coincide, the system comprising:

means for displaying a series of active images generated from multiple temporally sequential frames of visual data, such that the series of active images comprise a moving video image of at least those portions of successive frames of visual data that overlap;

means for obtaining camera metric data for generating the visual display including time information, wherein the visual display may be temporally and spatially modified by panning;

means for positioning each displayed image on a display screen with respect to the position of other displayed images on the display screen in accordance with the spatial relationship in the panoramic region of the content of the displayed image to the content of the other displayed images; and means for displaying one or more context images while said series of active images is displayed, each context image being at least part of an image represented by a previously displayed frame of the set of temporally sequential frames of visual data, said frame no longer corresponding to an active image such that the context image is displayed as a static image;

whereby the one or more context images are displayed statically to provide a context display for the series of active images displayed as a moving video image and an active display including the series of active images.

24. A computer readable storage medium on which is stored one or more computer programs for producing a visual display of a panoramic region from a set of temporally sequential frames of visual data, each frame of visual data representing an image defining a region within the panoramic region such that at least two of the images define regions that do not coincide, the one or more computer programs comprising:

instructions for displaying a series of active images generated from multiple temporally sequential frames of visual data, such that the series of active images comprise a moving video image of at least those portions of successive frames of visual data that overlap;

instructions for obtaining camera metric data for generating the visual display including time information, wherein the visual display may be temporally and spatially modified by panning;

instructions for positioning each displayed image on a display screen with respect to the position of other displayed images on the display screen in accordance with the spatial relationship in the panoramic region of the content of the displayed image to the content of the other displayed images; and instructions for displaying one or more context images while said series of active images is displayed, each context image being at least part of an image represented by a previously displayed frame of the set of temporally sequential frames of visual data, said frame no longer corresponding to an active image such that the context image is displayed as a static image;

whereby the one or more context images are displayed statically to provide a context display for the series of active images displayed as a moving video image and an active display including the series of active images.

25. A method as in claim 13, wherein:

data in which a branch point is identified is a first set of temporally sequential frame of visual data representing a panoramic region at a first time; and the new set of frames of visual data is a second set of temporally sequential frames of visual data representing the panoramic region at a second time that is different from the first time.

* * * * *